(12) United States Patent
Kahn et al.

(10) Patent No.: US 8,290,991 B2
(45) Date of Patent: *Oct. 16, 2012

(54) ATOMIC DELETION OF DATABASE DATA CATEGORIES

(75) Inventors: Clifford E. Kahn, Westford, MA (US); Roger A. Chickering, Granite Bay, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 12/795,426

(22) Filed: Jun. 7, 2010

(65) Prior Publication Data

US 2011/0145209 A1 Jun. 16, 2011

Related U.S. Application Data

(63) Continuation-in-part of application No. 12/637,930, filed on Dec. 15, 2009.

(51) Int. Cl.
*G06F 17/30* (2006.01)
(52) U.S. Cl. ............. 707/813; 707/687; 707/708; 711/1
(58) Field of Classification Search .......... 707/813–820, 707/642, 687, 708; 711/1–6
See application file for complete search history.

(56) References Cited

U.S. PATENT DOCUMENTS

| | | | | |
|---|---|---|---|---|
| 7,769,792 | B1 * | 8/2010 | Burrows et al. | 707/814 |
| 7,877,371 | B1 * | 1/2011 | Lerner et al. | 707/708 |
| 8,140,599 | B1 * | 3/2012 | Patterson | 707/813 |
| 2002/0016185 | A1 * | 2/2002 | Yuzawa | 455/556 |
| 2002/0029220 | A1 * | 3/2002 | Oyanagi et al. | 707/101 |
| 2003/0131252 | A1 * | 7/2003 | Barton | 713/193 |
| 2003/0172091 | A1 * | 9/2003 | Norcott | 707/203 |
| 2006/0242464 | A1 * | 10/2006 | Holt | 714/25 |
| 2008/0195678 | A1 * | 8/2008 | Chen et al. | 707/205 |

OTHER PUBLICATIONS

Co-pending U.S. Appl. No. 12/637,930, filed Dec. 15, 2009 entitled "Atomic Deletion of Database Data Categories" by Clifford E. Kahn et al., 52 pages.
TCG Trusted Network Connect, "TNC IF-MAP binding for SOAP", Version 1.0, Revision 25, Apr. 28, 2008, 99 pages.

* cited by examiner

*Primary Examiner* — Dennis Truong
(74) *Attorney, Agent, or Firm* — Harrity & Harrity, LLP

(57) ABSTRACT

A device may maintain, in a database, a plurality of data items, each data item of the plurality of data items being associated with a respective category and supplemental information relating to deletion of the data item. The device may associate a group of counters with at least one of the categories and receive a deletion request corresponding to one of the group of categories, the deletion request including the supplemental information. The device may identify a counter associated with the category corresponding to the deletion request based on the supplemental information. The device may then increment the identified counters and selectively delete the data items based on values of the counters.

20 Claims, 16 Drawing Sheets

ATOMIC DELETION OF DATABASE DATA CATEGORIES

RELATED APPLICATIONS

This application claims priority from and is a continuation-in-part (CIP) of U.S. patent application Ser. No. 12/637,930, filed Dec. 15, 2009, entitled "ATOMIC DELETION OF DATABASE CATEGORIES," the disclosure of which is incorporated herein by reference.

BACKGROUND

Database management systems (DBMSs) organize the storage of data. DBMSs control the creation, maintenance and use of data structures stored in their databases. Database data structures are typically stored in memory or on hard disk in one of many forms, including ordered or unordered flat files, heaps, hash buckets, B+ trees or Indexed Sequential Access Method (ISAM) structures. Databases typically conduct database transactions by enforcing one or more of four rules: atomicity, consistency, isolation and durability. The atomicity rule requires that all tasks in a transaction must be performed, or that none of the tasks in the transaction should be performed. The consistency rule requires that every transaction preserves the integrity constraints of the database. The isolation rule requires that two simultaneous transactions not interfere with one another (i.e., intermediate results within a transaction are not visible to other transactions). The durability rule requires that completed transactions not be aborted or their results discarded.

Interface for Metadata Access Points (IF-MAP) is a protocol that provides a standardized framework for network and security devices to publish device data, such as, for example, Internet Protocol (IP) address or authentication data, to a central repository that can be used by other applications. The central repository can be used for security, asset management, discovery, or other purposes. The central repository, thus, acts as a DBMS that manages data related to network and security devices. Data published to the IF-MAP repository may be labeled with an identifier of the publisher that published the data to the repository. The IF-MAP protocol then permits a publisher to subsequently purge (i.e., delete) previously published material using, for example, a purgePublisher request. Data from the repository labeled with the publisher's identifier must be deleted in response to the issuance of a IF-MAP purgePublisher request. A publisher may desire to purge published data due to, for example, a system failure, a system re-start or a network disconnection event associated with the publisher.

SUMMARY

One implementation is directed to a computing-device implemented method that includes maintaining, by a data access point, data items, each data item of the data items being associated with a respective category of the data item and supplemental information relating to deletion of the data item. The method may further include associating a number of counters with at least one of the categories and receiving a deletion request corresponding to one of the categories, the deletion request including the supplemental information. The method may further include identifying, in response to the deletion request, one or more of the counters associated with the category corresponding to the deletion request, the identification being performed based on the supplemental information included with the deletion request and incrementing the identified counters. The method may further include selectively deleting, by the data access point, one or more of the data items based on values of the number of counters.

Another implementation is directed to a device that includes a memory to store instructions and a processor to execute the instructions. The processor may execute the instructions to maintain a database; connect to client devices that publish information to the database; and store, in the database, data items published by the client devices, each of the data items being associated with supplemental information relating to deletion of the data items and a deletion count value. The processor may further execute the instructions to maintain categories corresponding to the data items; maintain counters corresponding to each of the categories, at least some of the categories being associated with the counters; receive a deletion request corresponding to a first of the categories, the deletion request including the supplemental information; identify, for the deletion request for the first category, and based on the supplemental information, one or more of the counters; increment the identified counters; and selectively delete one or more of the data items based on values of the counters.

In yet another possible implementation, a computer-readable medium may contain instructions executable by at least one processor. The computer-readable medium may include instructions to maintain a number of data items, each data item being associated with a respective category of the data item and supplemental information relating to deletion of the data item; instructions to associate counters with at least one of the categories; instructions to receive a deletion request corresponding to one of the categories, the deletion request including the supplemental information; and instructions to identify, in response to the deletion request, one or more of the counters associated with the category corresponding to the deletion request, the identification being performed based on the supplemental information included with the deletion request. The computer-readable medium may further include instructions to increment the identified counters and instructions to selectively delete one or more of the data items based on values of the counters.

BRIEF DESCRIPTION OF THE DRAWINGS

The accompanying drawings, which are incorporated in and constitute a part of this specification, illustrate one or more embodiments described herein and, together with the description, explain the invention. In the drawings.

DETAILED DESCRIPTION

The following detailed description refers to the accompanying drawings. The same reference numbers may be used in different drawings to identify the same or similar elements. Also, the following detailed description does not limit the invention. Instead, the scope of the invention is defined by the appended claims and equivalents.

Exemplary embodiments described herein implement mechanisms for atomically deleting categories of data from a database. As described herein, a counter value, which maintains a current count representing the quantity of times a given category has been deleted, is used when deciding whether to delete items of data that are associated with the category. A category, as referred to herein, includes a label that identifies a set of related data items. When a new item of data is received for storing in the database, where the item of data is associated with a category, a current count, representing the quantity of times that a particular category has been deleted, is incremented and the new value is stored in the database. Individual data items may then be selected for deletion from the database by comparing the new value of the count, that represents the quantity of times that the category has been deleted, with the previously stored count associated with each item of data. Subsequently, when a deletion request is received for the category, a current count, representing the quantity of times that the category has been deleted, is obtained at that particular instant in time, and compared to the previously stored count associated with the item of data. If the current count is greater than the previously stored count, then the item of data may be deleted from memory during a garbage collection process. This garbage collection process may be repeated for each data item stored in the memory that is associated with the same category.

Exemplary Network

Figure 1A:
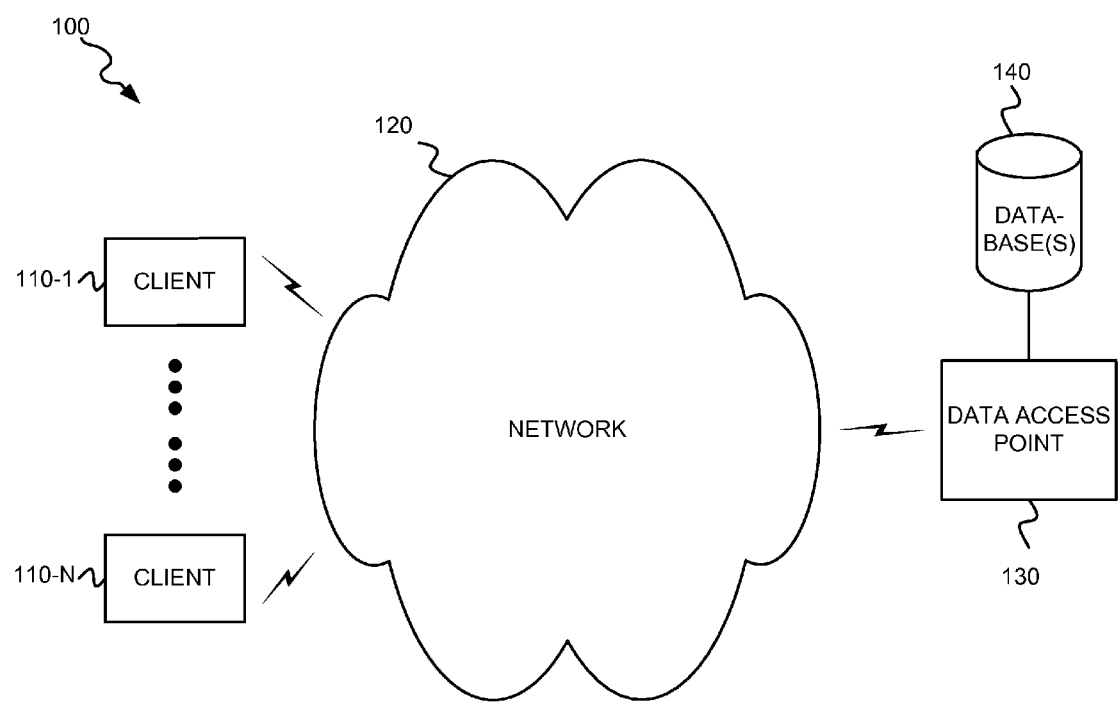
FIG. 1A is a diagram of an exemplary network in which systems and methods described herein may be implemented.

FIG. 1A depicts an exemplary network 100 in which systems and methods described herein may be implemented. Network 100 may include multiple clients 110-1 through 110-N, a network 120, a data access point 130, and a database 140. Clients 110-1 through 110-N, and data access point 130, may connect to network 120 via wired or wireless links Each of clients 110-1 through 110-N (collectively referred to herein as "clients 110," or generically referred to herein as "client 110") may include a server (e.g., a rack mounted server), a computer (e.g., laptop, desktop or palmtop), a cellular radiotelephone, a personal digital assistant (PDA), or a Personal Communications Systems (PCS) terminal. In some embodiments, one or more of clients 110 may include a server entity that may interact with data access point 130 via network 120.

Network 120 may include one or more networks of any type, including a local area network (LAN); a wide area network (WAN); a metropolitan area network (MAN); a telephone network such as a Public Switched Telephone Network (PSTN) or a Public Land Mobile Network (PLMN); a satellite network; an intranet; the Internet; or a combination of networks. The PLMN may further include a packet-switched network, such as, for example, a General Packet Radio Service (GPRS) network, a Cellular Digital Packet Data (CDPD) network, or a Mobile IP network.

Data access point 130 may include a server entity or device that may receive update requests from clients 110-1 through 110-N for storing data items in database 140. Upon receipt of such update requests, data access point 130 may store the requested data item(s) in database 140, as described in further detail below. Data access point 130 may further receive query requests for accessing data items stored in database 140. Upon receipt of such requests, data access point 130 may access and retrieve the requested data item(s) from database 140 and return them to the requesting one of clients 110. Data access point 130 may also receive category deletion requests from clients 110-1 through 110-N. Upon receipt of a category deletion request, data access point 130 may delete data items from database 140 that correspond to the category that has been requested to be deleted.

Database 140 may include any type of existing database that may store data for retrieval by data access point 130. Data access point 130 may, for example, interact with database 140 to store data items received from clients 110-1 through 110-N, may retrieve previously stored data items from database 140, and may delete data items associated with one or more categories.

The number of devices depicted in FIG. 1A is exemplary. Fewer, or more, devices than those shown may be included in network 100. Operations described herein as being performed by one device in network 100 may be performed by one or more other devices.

Figure 1B:
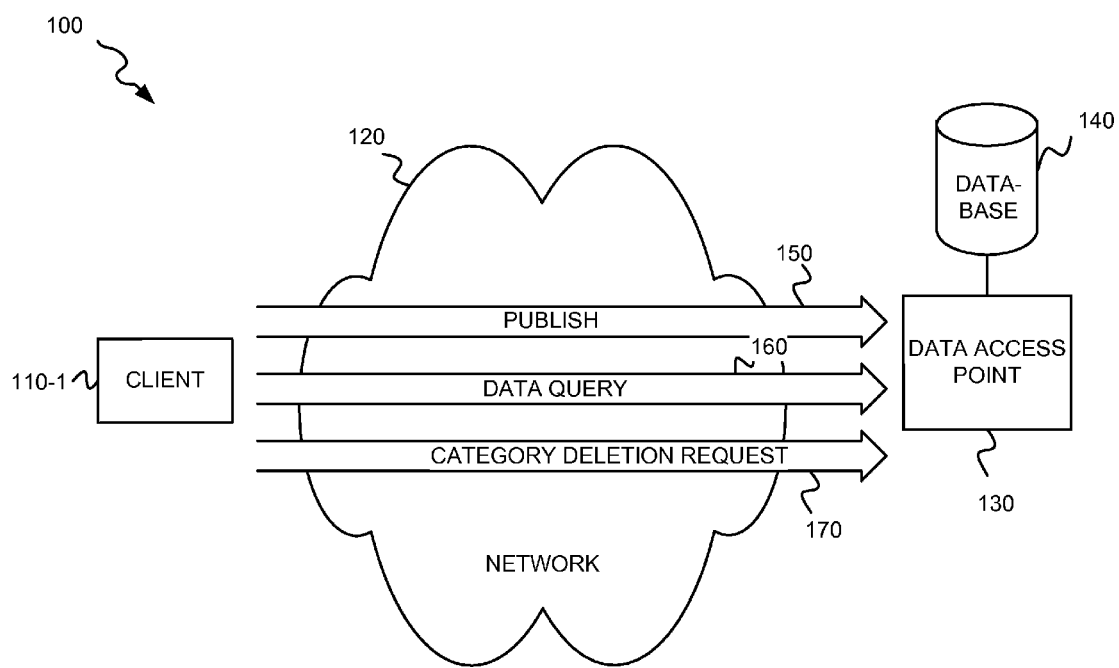
FIG. 1B is a diagram of exemplary interactions between a client and the data access point of FIG. 1A.

FIG. 1B graphically depicts exemplary interactions between a client (e.g., client 110-1) and data access point 130. As shown, client 110-1 may publish 150 a data item(s) to data access point 130. Publishing of a data item(s) to data access point 130 enables data access point 130 to store the data item(s) in database 140 for modification and/or retrieval by any of clients 110-1 through 110-N. Client 110-1 may further send a data query 160 to data access point 130 for retrieving a specific data item(s) from database 140. Client 110-1 may also send a category deletion request 170 to data access point 130 for deleting an entire category of data items stored in database 140. In an embodiment in which database 140 is serving as an IF-MAP repository, a given category may include an identifier of the publisher that published the data item(s) to the repository (e.g., a unique identifier of a respective one of clients 110). In such an IF-MAP embodiment, the category deletion request may correspond to an IF-MAP purgePublisher request.

Interactions, other than those shown in FIG. 1B, may occur between clients 110 and data access point 130.

Exemplary Network Device

Figure 2:
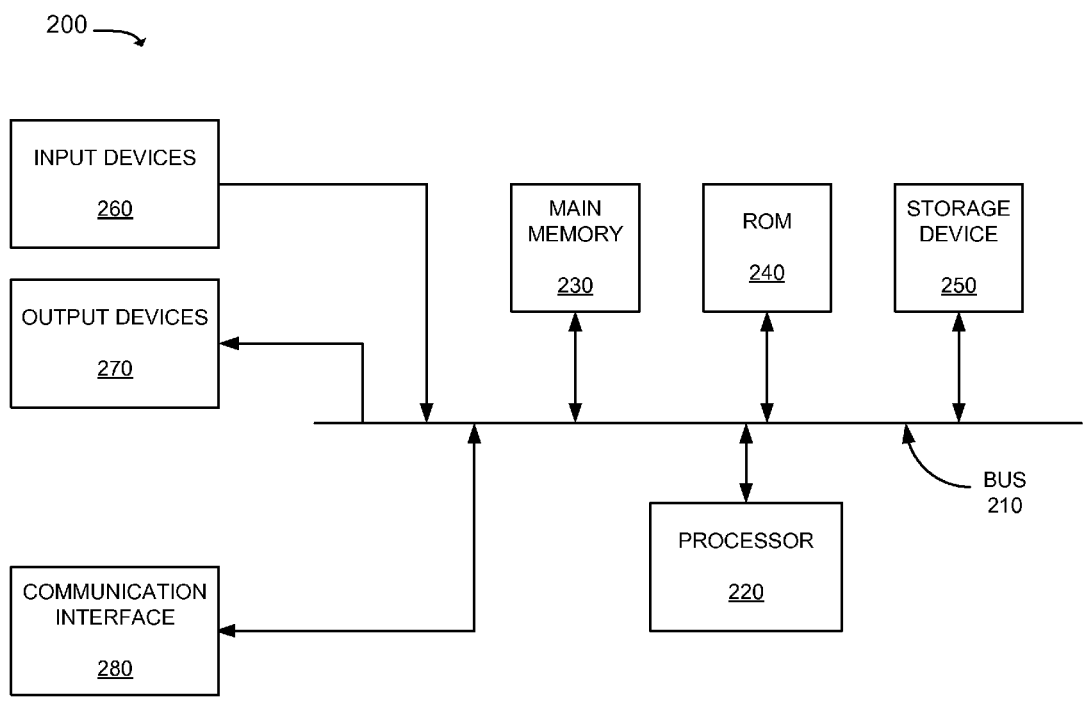
FIG. 2 is a diagram of components of an exemplary device that may correspond to the clients and/or data access point of FIG. 1B.

FIG. 2 is a diagram of components of a device 200 according to an exemplary embodiment. Device may correspond to each of clients 110-1 through 110-N, and data access point 130. Device 200 may include a bus 210, a processor 220, a main memory 230, a read only memory (ROM) 240, a storage device 250, input device(s) 260, output device(s) 270, and a communication interface 280. Bus 210 may include a path that permits communication among the components of device 200.

Processor 220 may include, for example, a processor, microprocessor, and/or processing logic that may interpret and execute instructions. In some implementations, processor 220 may include multiple processors (e.g., parallel processors). Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive. Storage device 250 may further include a solid state drive.

Input device(s) 260 may include one or more mechanisms that permit an operator to input information to device 200, such as a keyboard, a mouse, a pen, voice recognition and/or biometric mechanisms, etc. Output device(s) 270 may include one or more mechanisms that output information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via network 120.

Device 200 may perform certain operations or processes, as will be described in detail below. Device 200 may perform these operations in response to processor 220 executing software instructions contained in a computer-readable medium, such as memory 230. A computer-readable medium may be defined as a physical or logical memory device. A logical memory device may include memory space within a single physical memory device or spread across multiple physical memory devices.

The software instructions may be read into memory 230 from another computer-readable medium, such as storage device 250, or from another device via communication interface 280. The software instructions contained in memory 230 may cause processor 220 to perform operations or processes that will be described later. Alternatively, hardwired circuitry may be used in place of or in combination with software instructions to implement processes consistent with the principles of the invention. Thus, exemplary implementations are not limited to any specific combination of hardware circuitry and software.

Exemplary Data Item Table

Figure 3:
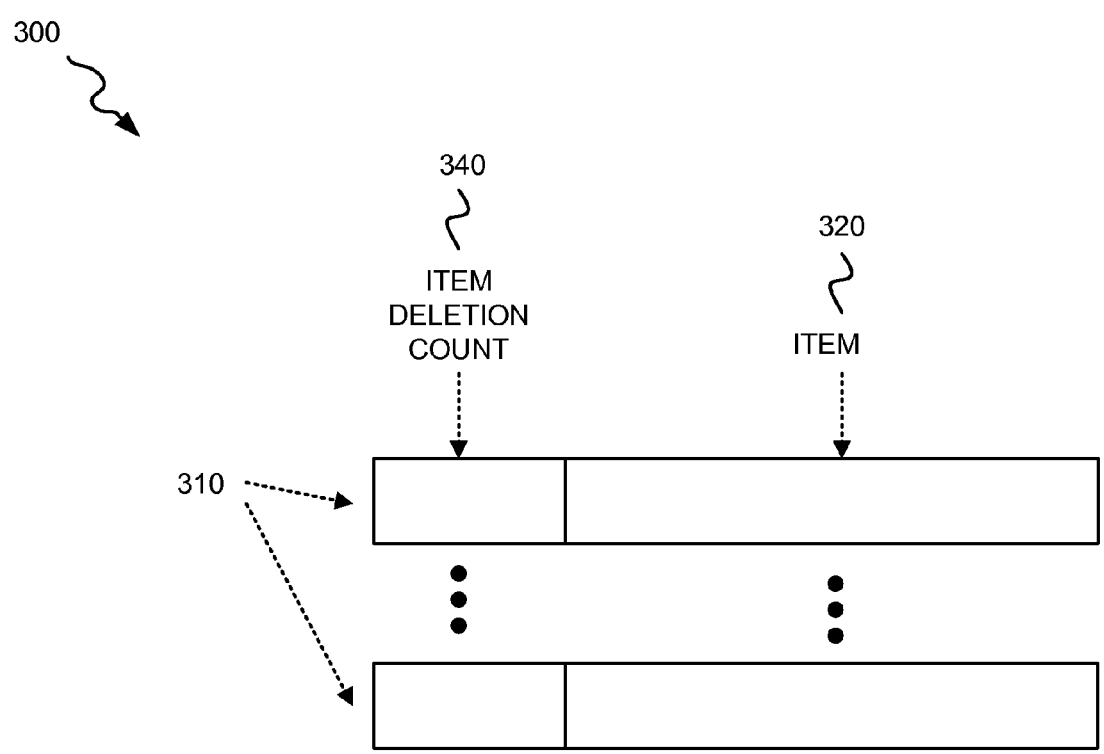
FIG. 3 is a diagram of a first exemplary table that may be stored in the database of FIG. 1A.

FIG. 3 illustrates a data item table 300 according to an exemplary embodiment. Data item table 300 may be stored in database 140. Data item table 300 may include multiple entries 310, each of which may include a data item field 320, and an item deletion count field 340. Entries 310 may include additional, and/or different, fields than those depicted in FIG. 3.

Data item field 320 may store a specific item of data received from a client 110. The item of data may include any type of data. For example, the item of data may include any type of data published using the IF-MAP protocol, such as information about other equipment and users in the network published by a client 110. In one implementation, client 110 may include a login server that decides whether to permit another computer to log-in to a network, and subsequently publishes information about the log-in computer (or the user of the log-in computer). A category may be associated with each corresponding data item stored in item field 320. The category may, for example, identify a set of related data items. In an IF-MAP protocol embodiment, for example, the category may include an identifier of the publisher, which published the data item stored in item field 320, to database 140. One or more items of data stored in item fields 320 of table 300 may, therefore, be associated with a category. Item deletion count field 340 may include a count of how many times a category had been deleted at a point in time in which the data item stored in item field 320 was received for storage in table 300. In some embodiments (not shown), there may be several versions of a same data item, with each version being labeled with a different value in item deletion count field 340.

Exemplary Category Table

Figure 4:
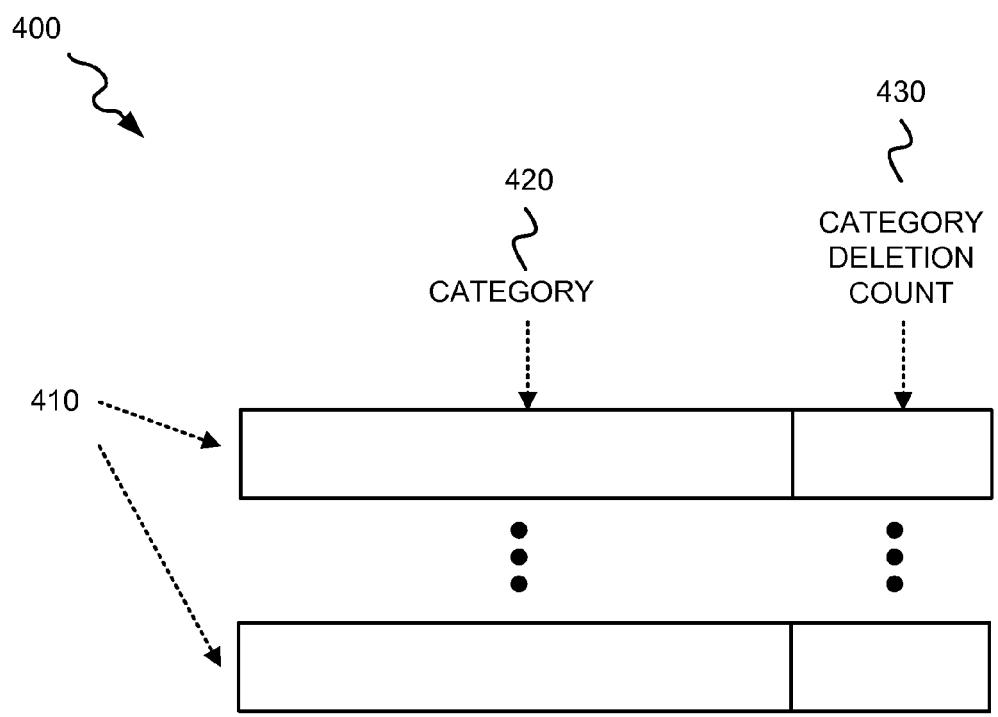
FIG. 4 is a diagram of a second exemplary table that may be stored in the database of FIG. 1A.

FIG. 4 illustrates a category table 400 according to an exemplary embodiment. Category table 400 may be stored in database 140. Category table 400 may include multiple entries 410, each of which may include a category field 420 and a category deletion count field 430. Entries 410 may include additional, and/or different, fields than those depicted in FIG. 3.

Category field 420 may store an identifier that identifies a category of data stored in database 140. Each category may identify a set of related data items that are stored in a respective item field 320 of table 300. Category deletion count field 430 may store a value representing the quantity of times the category, identified in category field 420 of a corresponding entry 410, has been deleted. Each time a deletion request is received for a category identified in category field 420, a counter value, stored in category deletion count field 430, may be incremented.

Exemplary Process for Categorizing and Storing an Item of Data

Figure 5:
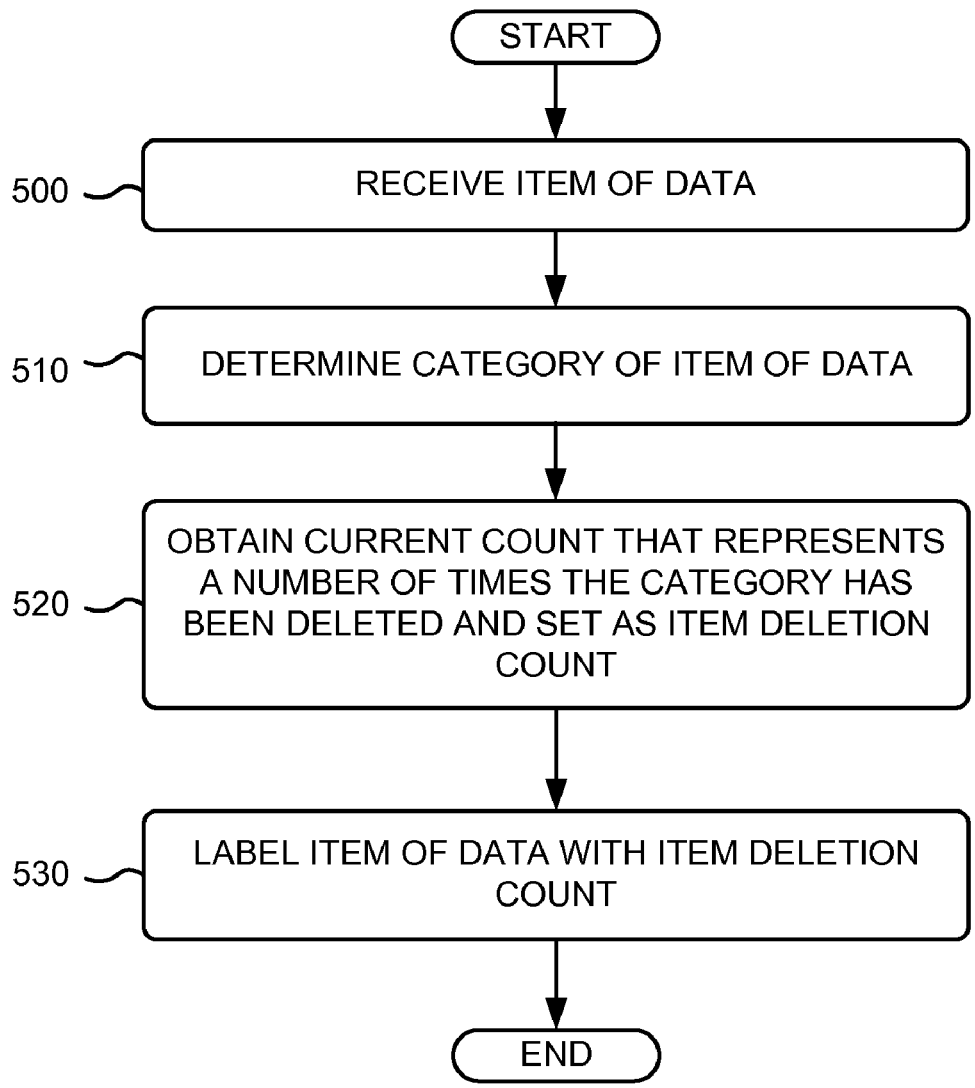
FIG. 5 is a flow chart that illustrates an exemplary process for categorizing and storing an item of data in the database of FIG. 1A.

FIG. 5 is a flow chart that illustrates an exemplary process for categorizing and storing an item of data received by data access point 130 from a client 110. The exemplary process of FIG. 5 may be implemented by data access point 130. In other embodiments, some or all of the blocks described below may be performed by another device or a combination of devices.

The exemplary process may include receiving an item of data (block 500). For example, as shown in FIG. 1B, data access point 130 may receive a publish request 150 that includes an item of data to be published (i.e., stored and made available to clients 110-1 through 110-N) in database 140. One of clients 110 may send publish request 150 to data access point 130 via network 120.

A category of the received item of data may be determined (block 510). The category of the received data item may be determined by extracting data from the data item, or from data related to the data item, or by computing a function of the data item. The function may include any type of function that may operate upon the data item to compute a category. In some embodiments, the category of the received item of data may be extracted from the publish request 150 received from a client 110. In an IF-MAP embodiment, for example, publish request 150 may include a publisher identifier (ID) that identifies client 110 that sent the item of data for storage, and this publisher ID may be extracted from publish request 150 and used as the category of the received item of data.

A current count that represents a number of times that the category has been deleted may be obtained and set as an item deletion count for the item of data (block 520). The category determined in block 510 may be matched with a category stored in category field 420 of table 400. A category deletion count from field 430 of the entry 410, in which the matching category field 420 is identified, may be retrieved from table 400. The retrieved category deletion count may then be set as the item deletion count for the item of data.

The item of data may be labeled with the obtained item deletion count (block 530). In one embodiment, the labeling may include storing the obtained deletion count in the corresponding item deletion count 340 of table 300.

Exemplary Category Deletion and Garbage Collection Process

Figure 6:
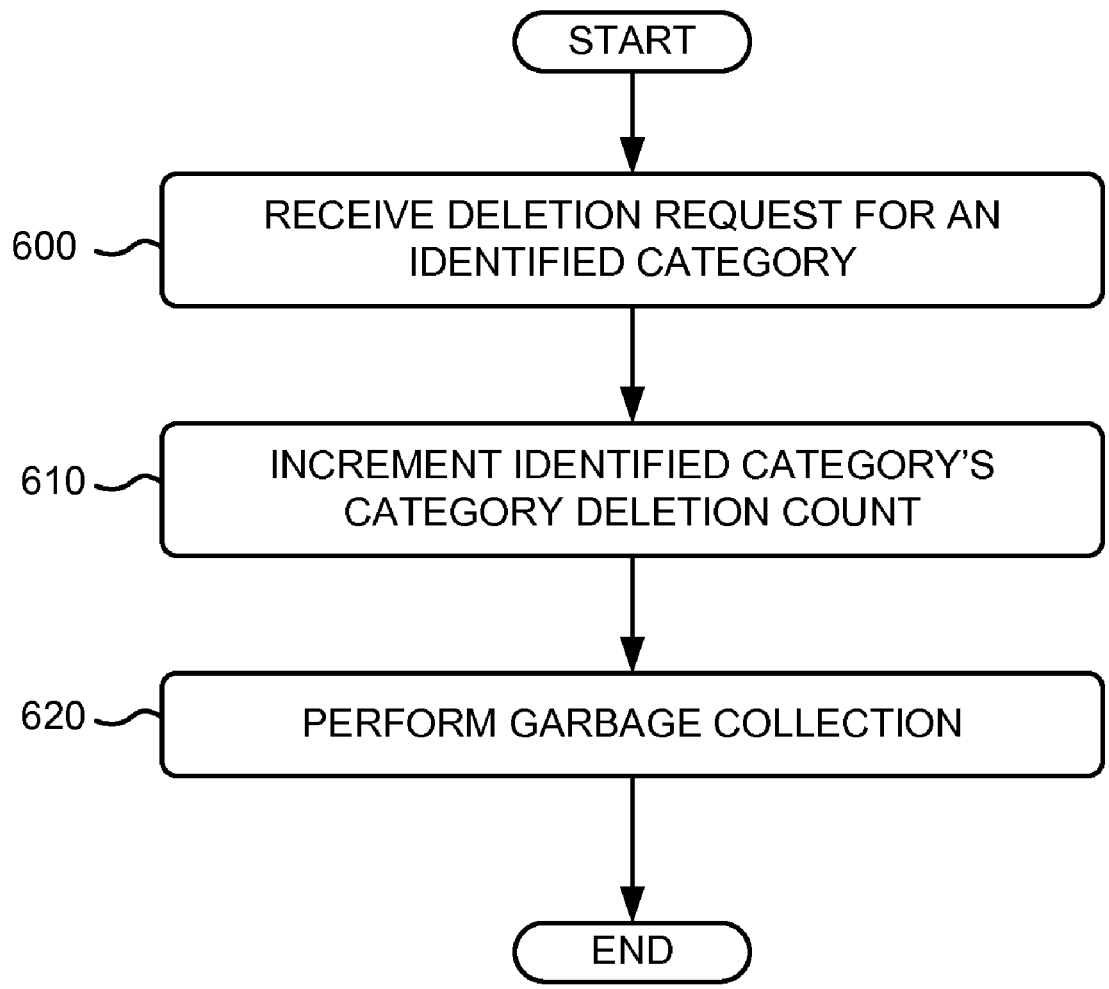
FIG. 6 is a flow chart that illustrates an exemplary process for receiving a category deletion request and for performing garbage collection with respect to data stored in the database of FIG. 1A.
Figure 7:
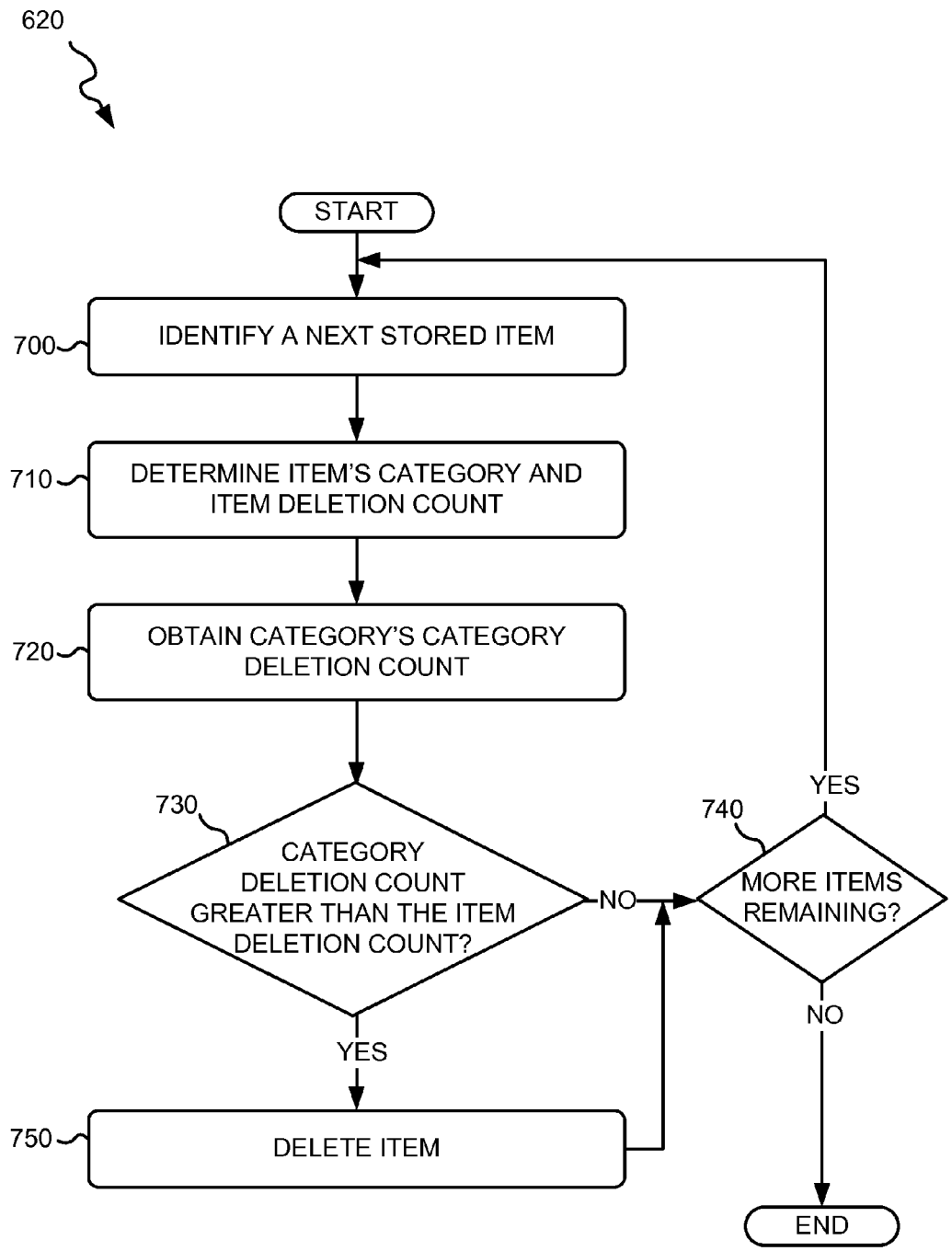
FIG. 7 is a flow chart that illustrates an exemplary garbage collection process for deleting data stored in the database of FIG. 1A.

FIGS. 6 and 7 are flow charts that illustrate an exemplary process for deleting a category and for performing garbage collection. The exemplary process of FIGS. 6 and 7 may be implemented by data access point 130. In other embodiments, some or all of the blocks described below may be performed by another device or a combination of devices.

The exemplary process may include receiving a deletion request for an identified category (block 600). A client 110 may send a deletion request, which identifies a particular category, to data access point 130 via network 120. Referring to FIG. 1B, for example, client 110-1 may send category deletion request 170 to data access point 130. Category deletion request 170 may include an identifier of a category. In one embodiment, the category identifier may include a unique identifier associated with client 110 that published the data items that are already associated with the category in database 140. Additionally, the deletion request may occur when it is determined that data access point 130 has lost contact with one of clients 110-1 through 110-N. Upon a loss of contact with one of clients 110-1 through 110-N, a deletion request may be considered to have been received by data access point 130 for a corresponding category.

The identified category's deletion count may be incremented (block 610). Table 400 may be searched to identify an entry, where the identifier in category field 420 matches the category identifier contained in the deletion request. The corresponding category deletion count field 430 for the entry may be retrieved, incremented, and then re-stored in the same category deletion count field 430.

Garbage collection may be performed (block 620). The garbage collection process may traverse through stored data items in table 300 to compare each data item's item deletion count with the count value stored in the identified category's category deletion count 430. If the comparison indicates that the count value stored in the identified category's category deletion count field 430 is greater than the data item's count value stored in the item deletion count field 340, then the data item may be deleted from table 300. Further exemplary details of the garbage collection process are described below with respect to FIG. 7.

The garbage collection process may begin with the identification of a next stored data item (block 700). During the first occurrence of block 700 in the garbage collection process, the next stored data item may be a first data item stored in database 140. Various techniques may be used for identifying a data item in table 300. In one embodiment, table 300 may be sequentially searched to process each stored data item corresponding to an entry 310. In another embodiment, table 300 may be indexed by category, so that members of a category that have had their deletion counts incremented can be found relatively quickly.

The data item's category and item deletion count may be determined (block 710). The contents of item deletion count field 340 of the data item identified in block 700 may be retrieved from table 300. The category of the data item identified in block 700 may be determined by extracting data from the data item, or from data related to the data item, or by computing a function of the data item. The function may include any type of function that may operate upon the data item to compute a category (i.e., the same function used in block 510 above). In some embodiments, the category of the received item of data may be extracted from the original publish request 150 received from a client 110. In an IF-MAP embodiment, for example, publish request 150 may include a publisher identifier (ID) that identifies client 110 that sent the item of data for storage, and this publisher ID may be extracted from publish request 150 and used as the category of the received item of data. The category's category deletion count may be obtained (block 720). The determined category from block 710 may be used to identify a matching category in an entry 410 in category field 420 of table 400. The contents of the corresponding category deletion count field 430 may then be retrieved.

A determination may be made whether the obtained category deletion count is greater than the item deletion count (block 730). A comparison may be made between the counter value stored in item deletion count field 340 retrieved in block 710 and the counter value stored in category deletion count field 430 retrieved in block 720. If the category deletion count is greater than the item deletion count (block 730—YES), then the item of data may be deleted (block 750). For example, if the counter value stored in the category deletion count field 430 retrieved in block 720 is greater than the counter value stored in the item deletion count field 340 retrieved in block 710, then the corresponding data item stored in item field 320 may be deleted, along with fields 330 and 340. The exemplary process may then continue at block 740.

It may be determined whether there are more data items remaining (block 740). If there are no more data items remaining (block 740—NO), then the exemplary process may end. If there are more data items remaining (block 740—YES), then the exemplary process may continue at block 700 with the identification of a next stored data item.

The exemplary process of blocks 700 through 750 may be repeated for each data item stored in table 300. Subsequent to completion of blocks 700-750 for each data item in table 300, the garbage collection process of block 620 may complete to finish the exemplary deletion request process of FIG. 6.

Exemplary Item Query Process

Figure 8:
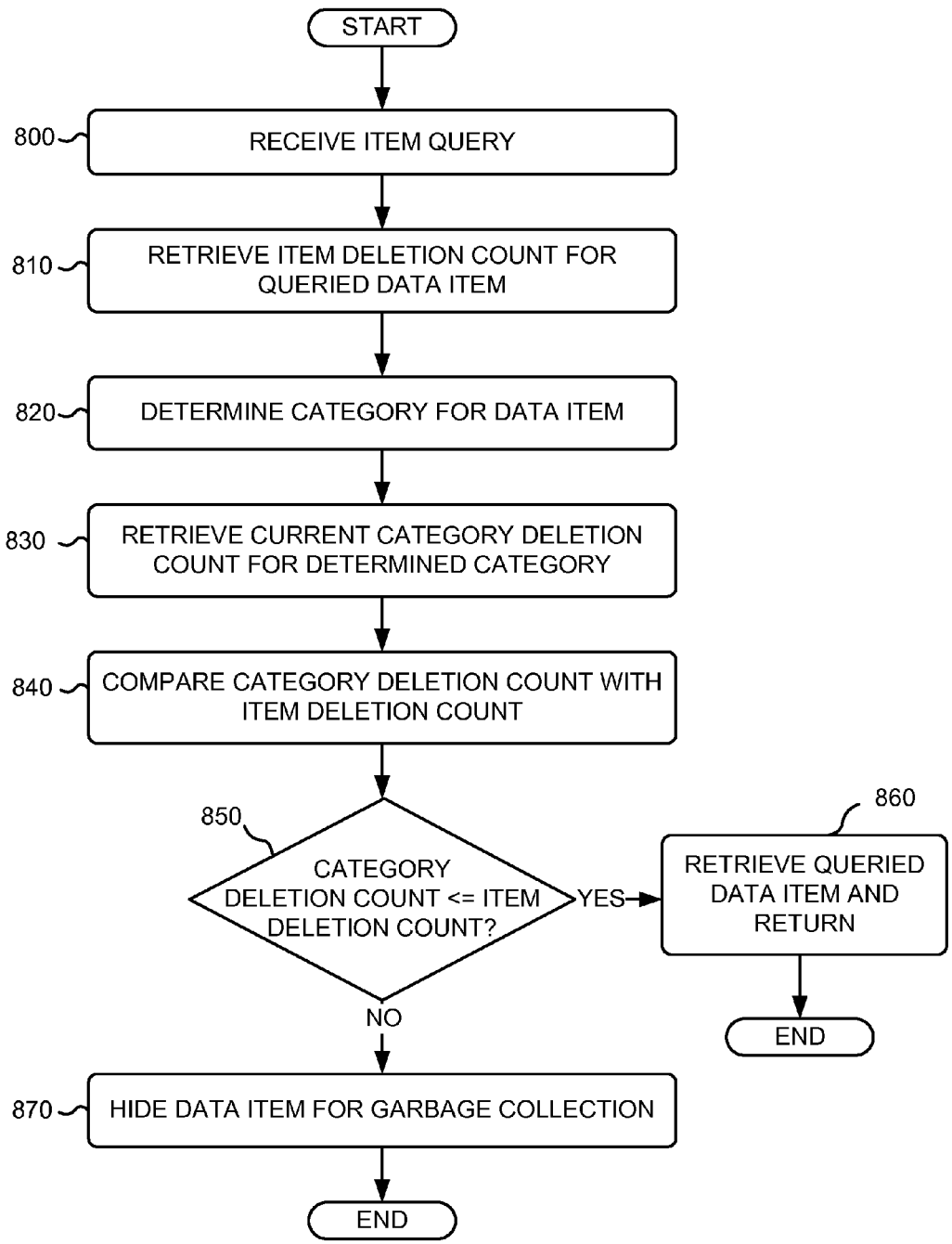
FIG. 8 is a flow chart that illustrates an exemplary process for responding to an item query received at the data access point of FIG. 1A.

FIG. 8 is a flow chart that illustrates an exemplary process for receiving an item query from client 110. The exemplary process of FIG. 8 may be implemented by data access point 130. In other embodiments, some or all of the blocks described below may be performed by another device or a combination of devices.

The exemplary process may include the receipt of an item query (block 800). A client 110 may send an item query to data access point 130 to seek to retrieve a specific data item(s) from database 140. An item deletion count for the queried item may be retrieved (block 810). The data item identified in the item query may be compared to the content of item fields 320 in table 300 to identify an entry 310 of table 300 whose content matches this item. The contents of the corresponding item deletion count 340, of the identified entry 310, may then be retrieved. A category for the data item may be determined (block 820). The category of the data item may be determined by extracting data from the data item, or from data related to the data item, or by computing a function of the data item. The function may include any type of function that may operate upon the data item to compute a category.

A current category deletion count for the determined category may be retrieved (block 830). Table 400 may be searched to locate an entry 410 whose category field 420 content matches the contents of category field 330 retrieved in block 820. The counter value stored in category deletion count field 430 for the identified entry 410 may be retrieved.

The category deletion count and the item deletion count may be compared (block 840). For example, the counter value stored in category deletion field 430, retrieved in block 830, may be compared with the counter value stored in item deletion count field 340, retrieved in block 810.

If the comparison of block 840 indicates that the category deletion count is less than or equal to the item deletion count (block 850—YES), then the queried data item may be retrieved and returned (block 860). The contents of item field 320 for entry 310, identified in block 810, may be retrieved and returned to the requesting client 110. If the comparison of block 840 indicates that the category deletion count is greater than the item deletion count (block 850—NO), then the queried data item may be hidden (block 870). A queried data item may be "hidden" by making the data item non-retrievable from table 300 in response to an item query, even though the queried item may still be stored in table 300. However, the queried data item may otherwise be retrievable for other processing until deleted in block 750 of FIG. 7 of the garbage collection process.

Atomic Deletion Using Multiple Counters

In the above description of the atomic deletion of data items associated with a category, each category was described as being associated with a single counter (e.g., category field 420 is associated with category deletion count field 430). The category of a particular data item may be derived from the data item itself, such as, for data item 320, an identifier of the publisher included within the data item. As described in more detail below, in some implementations, multiple counters may be implemented for a particular category. The choice of which of the multiple counters to use for a particular data item may be based, for example, on the data item and also based on other supplemental information associated with the data item.

Figure 9:
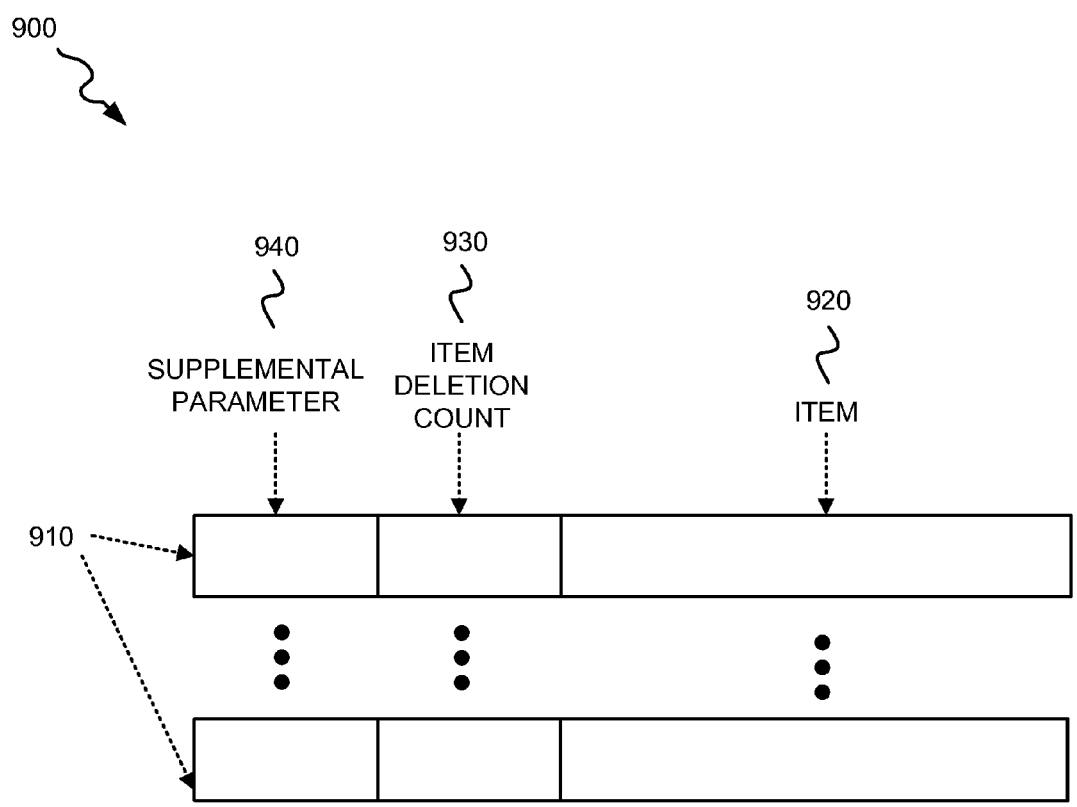
FIG. 9 is a diagram illustrating a data item table according to a second example embodiment.

FIG. 9 illustrates a data item table 900 according to a second example embodiment. Data item table 900 may be stored in database 140. Data item table 900 may include multiple entries 910, each of which may include a data item 920, an item deletion count field 930, and a supplemental parameter field 940. Entries 910 may include additional, and/or different, fields than those depicted in FIG. 9.

Data item 920 may store a specific item of data received from a client 110. The item of data may include any type of data. For example, the item of data may include any type of data published using the IF-MAP protocol, such as information about other equipment and users in the network published by a client 110. In one implementation, client 110 may include a log-in server that decides whether to permit another computer to log-in to a network, and subsequently publishes information about the log-in computer (and/or the user of the log-in computer). Data item 920 may include information that identifies, or can be used to identify, the category to which the data item belongs. For example, in an IF-MAP protocol embodiment, a "publisher-id" may be extracted from data item 920. The publisher-id may be relevant to a category associated with data item 920 (e.g., the category may be equivalent to the publisher-id).

Item deletion count field 930 may include a value of a counter associated with the entry 910 at a point in time in which the corresponding data item 920 was last stored or updated in table 900. The value of the counter may represent how many times the category associated with entry 910 was deleted at the point in time in which the corresponding data item 920 was last stored or updated in table 900.

Supplemental parameter 940 may include additional information received from client 110 relevant to deletion of the entry 910. In one implementation, the information represented by supplemental parameter 940 may be predetermined by data access point 130. In an alternative implementation, clients 110 may customize supplemental parameter 940. In one particular implementation, supplemental parameter 940 may represent a lifetime associated with the corresponding data item 920. The lifetime may be either a "session" lifetime, which may indicate that the data item is to be deleted when the client's communication session with data access point 130 ends, or an "indefinite" lifetime, which may indicate that the data item is to be retained when the client's communication session with data access point 130 ends.

Figure 10:
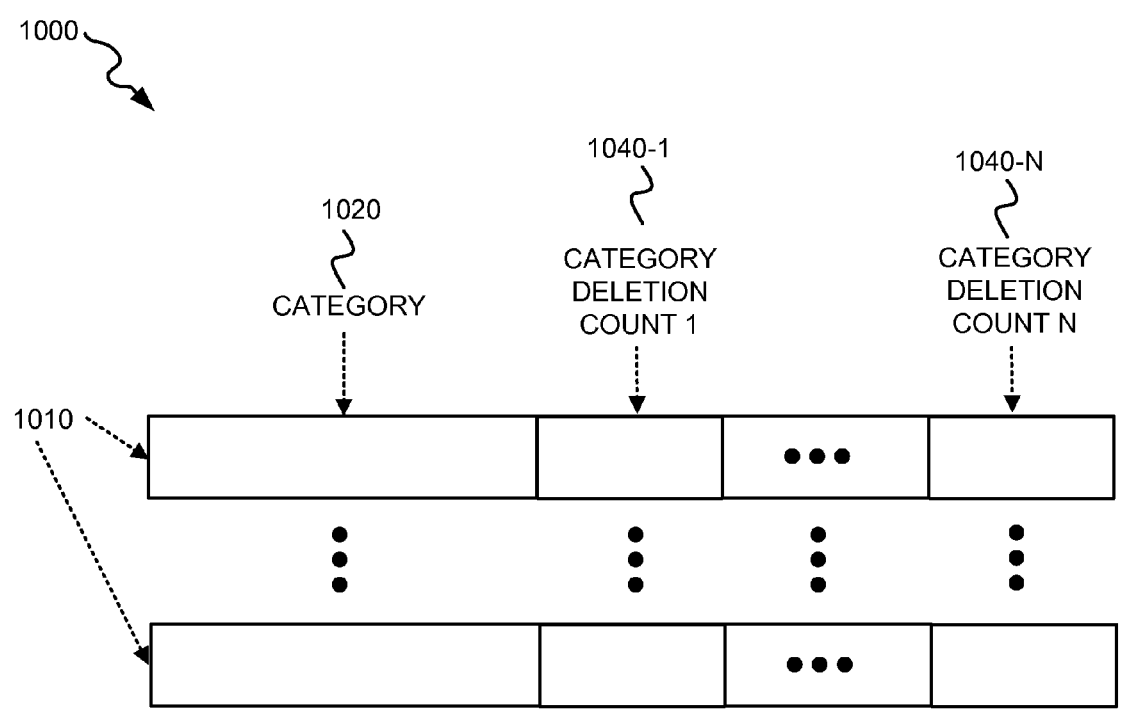
FIG. 10 illustrates a category table according to the second example embodiment.

FIG. 10 illustrates a category table 1000 according to the second example embodiment. Category table 1000 may be stored in database 140. Category table 1000 may include multiple entries 1010, each of which may include a category field 1020 and one or more deletion counters, illustrated as category deletion count fields 1040-1 through 1040-N. Entries 1010 may include additional, and/or different, fields than those depicted in FIG. 10.

For category deletion count fields 1040, in the case in which N=1, category deletion count field 1040-1 may be equivalent to category deletion count field 430 from the first embodiment. Updates to entries 910 (i.e., publish requests) and category deletion requests, as well as being associated with a particular category 1020, may also be associated with a particular category deletion count field 1040. Conceptually, a category and a category deletion count field 1040 for a request may together define one or more "sub-categories" for a client.

Category field 1020 may store an identifier that identifies a category of data stored by data access point 130. As mentioned, each data item 920 may correspond to a category 1020. In one implementation, each category may represent a client. When implementing the IF-MAP protocol, for instance, network devices may publish information, such as information relating to capabilities of the network devices, to data access point 130. In this situation, each network device that writes information to data access point 130 may correspond to a category.

Category deletion count fields 1040 may each store a counter value representing the quantity of times a deletion request corresponding to a particular category deletion count field has been received. Deletion of a category may correspond to the deletion of all entries 910 that match the category and in which the information in supplemental parameter field 940 matches the deletion request. Deletion of a category should be an atomic operation. Each time a category deletion request is received that corresponds to category deletion count for a category identified in category field 1020, the counter value, stored in the corresponding one of category deletion count fields 1040, may be incremented.

Figure 11:
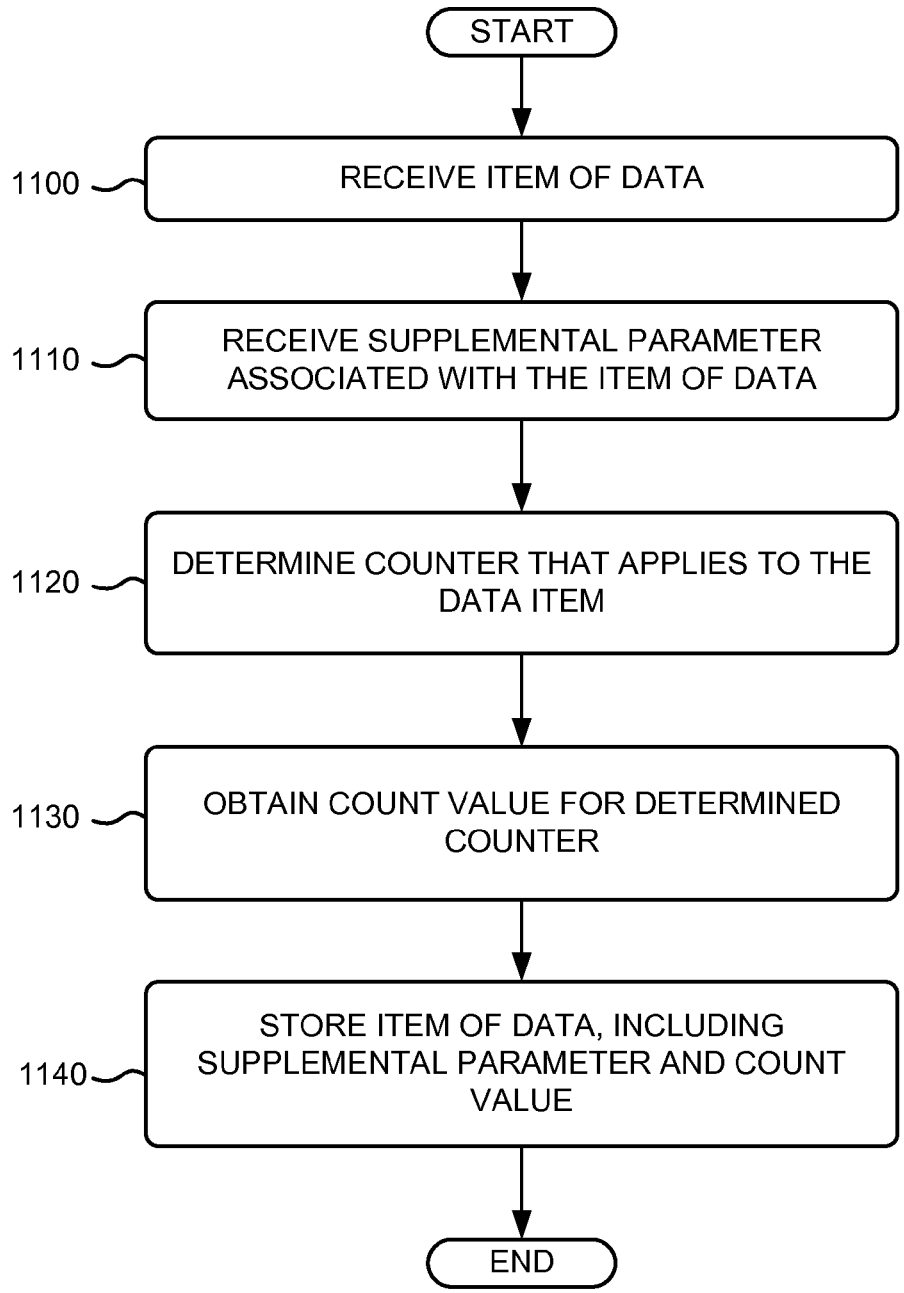
FIG. 11 is a flow chart that illustrates an example process for categorizing and storing an item of data received by a data access point.

FIG. 11 is a flow chart that illustrates an example process for categorizing and storing an item of data received by data access point 130 from a client 110 for the second embodiment. The example process of FIG. 11 may be implemented by data access point 130. In other embodiments, some or all of the blocks described below may be performed by another device or a combination of devices, including or excluding data access point 130.

The process may include receiving (either remotely or from a local source) an item of data (block 1100). For example, as shown in FIG. 1B, data access point 130 may receive a publish request 150 that includes an item of data to be published (i.e., stored and made available to clients 110-1 through 110-N). One of clients 110 may send publish request 150 to data access point 130 via network 120. A supplemental parameter associated with the item of data may be received (block 1110). The supplemental parameter may include information relevant to how the item of data is to be deleted. For example, in an IF-MAP implementation, certain clients may desire that published data items be maintained indefinitely by data access point 130. These data items may be said to have "indefinite" lifetimes. Other clients may desire that published data items only be available in data access point 130 while the client is connected to data access point 130. These data items may be said to have "session" lifetimes.

The process may further include determining a counter that applies to the data item (block 1120). The determination of the counter may be based on the received data item itself and based on the supplemental parameter. The determined counter may correspond to one of category deletion count fields 1040. For example, assume that the supplemental parameter was a bit representing "session lifetime" or "indefinite lifetime." In this case, there may be two category deletion count fields (e.g., N=2) for each category; one for session lifetime data items from the client (e.g., category deletion count field 1040-1) and one for indefinite lifetime data items for the client (e.g., category deletion count field 1040-2).

In some implementations, the function to apply to map the data item and the supplemental parameter to the counter may be predetermined by data access point 130. Alternatively, data access point 130 may accept custom mapping functions from clients 110, such as a custom categorization program or plugin, that may be created and uploaded by clients 110. Data access point 130 may apply the uploaded custom categorization program to implement block 1120.

The process may further include obtaining the count value for the determined counter (block 1130). The count value may be obtained by reading the value from the category deletion count field 1040, as determined in block 1020.

The process may further include storing the received item of data, including the supplemental parameter and the count value (block 1140). The data item may be stored as an entry 910 in table 900, in which the data item is stored in item field 920, the count value is stored in item deletion count field 930, and the supplemental parameter is stored in supplemental parameter field 940.

Figure 12:
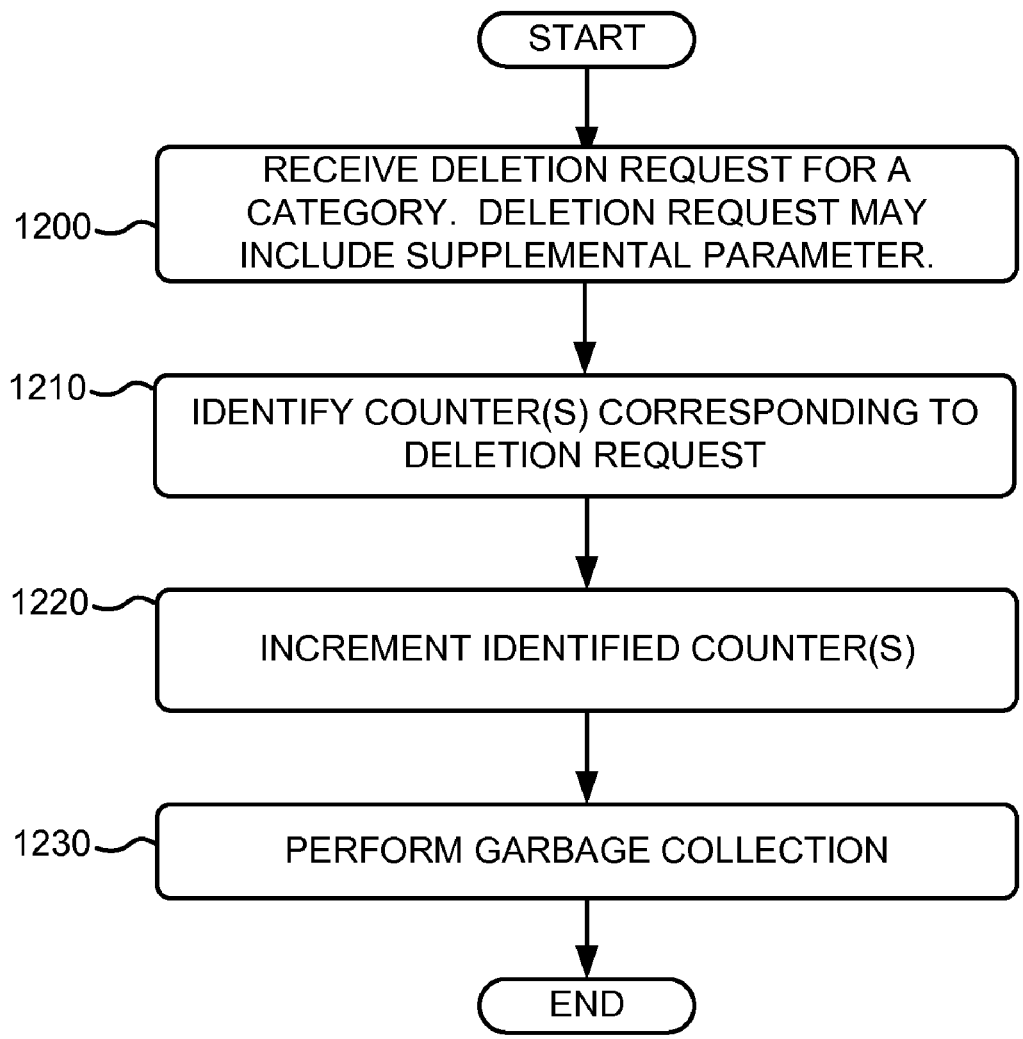
FIG. 12 is a flow chart that illustrates an example process for deleting a category.
Figure 13:
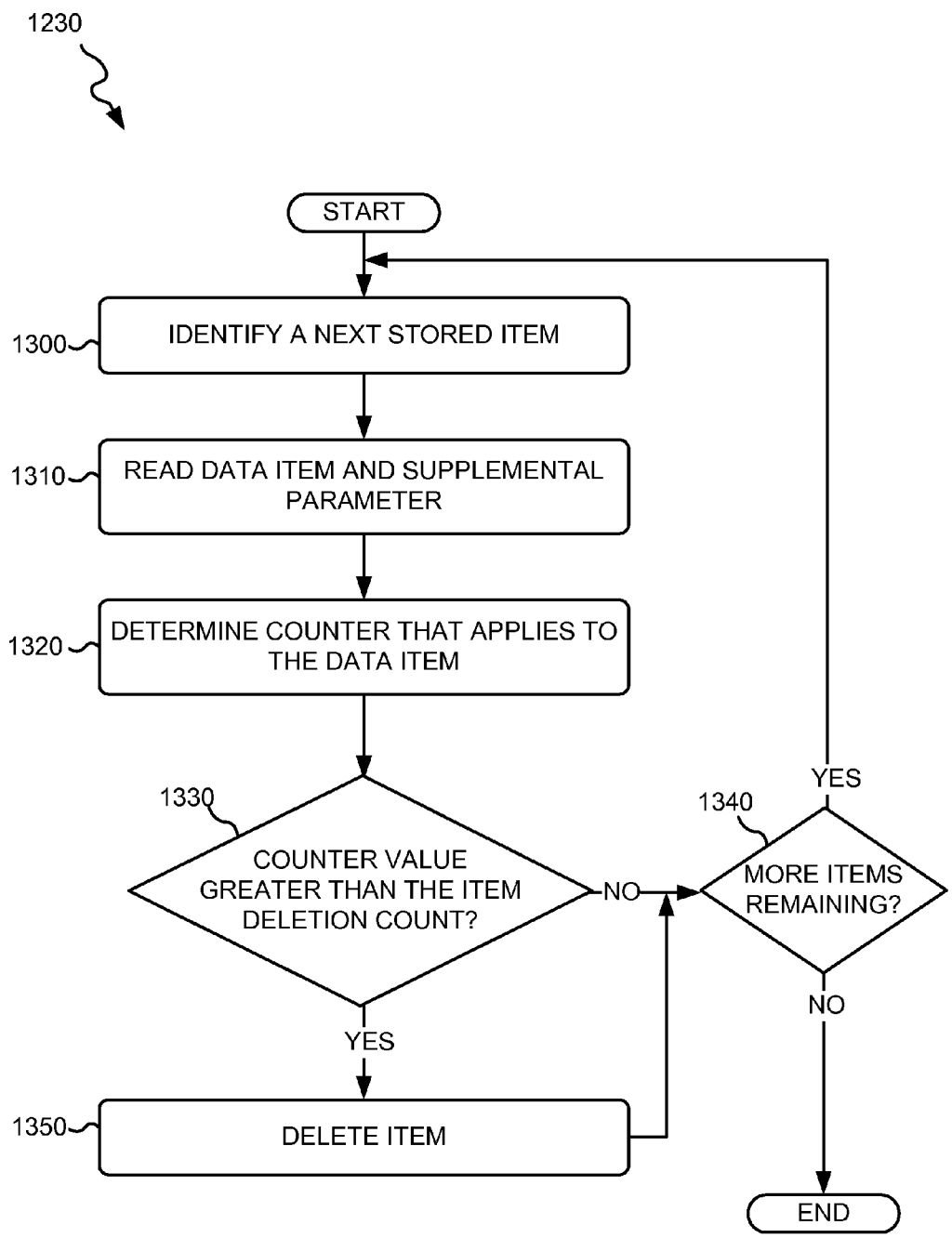
FIG. 13 is a flow chart that illustrates an example process for performing garbage collection.

FIGS. 12 and 13 are flow charts that illustrate an example process for deleting a category and for performing garbage collection for the second example embodiment. The example process of FIGS. 12 and 13 may be implemented by data access point 130. In other embodiments, some or all of the blocks described below may be performed by another device or a combination of devices, including or excluding data access point 130.

The example process may include receiving a deletion request for a category (block 1200). A client 110 may send a deletion request, which identifies a particular category, to data access point 130 via network 120. The deletion request may also include a supplemental parameter which may correspond to the supplemental parameter previously sent by client 110 when publishing data items. Referring to FIG. 1B, for example, client 110-1 may send category deletion request 170 to data access point 130. Category deletion request 170 may include an identifier of a category and a supplemental parameter. In one embodiment, the category identifier may include a unique identifier associated with client 110 that published the data items that are already associated with the category in data access point 130. The supplemental parameter may include a bit to indicate whether session lifetime or indefinite lifetime data items are to be deleted. In some implementations, client 110 may not transmit a supplemental parameter. This may indicate that any data item corresponding to a category are to be deleted regardless of the supplemental parameter associated with the data item.

In one implementation, which is described in more detail below, the deletion request, instead of being sent by a client 110, may be automatically generated by data access point 130. For example, in an implementation in which the supplemental parameter indicates session lifetime data, the deletion request may be generated by data access point 130 when a client loses contact with data access point 130.

The process may further include identifying the counter(s) corresponding to the deletion request (block 1210). The counters may be identified using the process applied in block 1120 (FIG. 11) when determining the counter that applies to a data item. The counters corresponding to the deletion request may be a function of the information identifying the category and the supplemental parameter. In some situations, such as when no supplemental parameter is received in block 1200, all of the counters for the category may be identified.

The process may further include incrementing the identified counters (block 1220). Incrementing a counter may include reading the value of the counter (i.e., reading the values in the identified category deletion count fields 1040), incrementing the value, and writing the incremented value back to the category deletion count field 1040.

Garbage collection may be performed (block 1230). The garbage collection process may traverse through stored data items to compare each data item's item deletion count with the count value stored in the counter corresponding to the data item. If the comparison indicates that the count value stored in the counter is greater than the data item's count value stored in the item deletion count field 930, then the data item may be deleted from table. Further exemplary details of the garbage collection process are described below with respect to FIG. 13.

The garbage collection process may begin with the identification of a next stored data item (block 1300). During the first occurrence of block 1300 in the garbage collection process, the next stored data item may be a first data item stored by data access point 130. Various techniques may be used for identifying a data item in table 900. In one embodiment, table 900 may be sequentially searched to process each stored data item corresponding to an entry 910. In another embodiment, table 900 may be indexed by category, so that members of a category that have had their deletion counts incremented can be found relatively quickly. The data item (i.e., from data item field 920) and the supplemental parameter (i.e., from supplemental parameter field 940) may then be read (block 1310).

The process may further include determining the counter that applies to the data item (block 1320). This determination may be identical to that performed in block 1120 (FIG. 11). The determined counter may correspond to one of category deletion count fields 1040.

The process may further include determining whether the counter value (from block 1320) is greater than the item deletion count of the data item (block 1330). If so (block 1330—YES), the data item may be deleted from table 900 (block 1350). Deletion of a data item may include deletion of the entire entry 910 from table 900.

The process may additionally include determining if additional data items remain in table 900 (block 1340). If there are no more data items remaining (block 1340—NO), then the process may end. If there are more data items remaining (block 1340—YES), then the process may continue at block 1300 with the identification of a next stored data item.

Blocks 1300 through 1340 may be repeated for each data item stored in table 900 to complete a garbage collection process.

Example Implementation in which the Supplemental Parameter Indicates the Lifetime of the Data Item As mentioned above, in one possible implementation, supplemental parameter 940 may be a parameter that determines whether a data item has a session lifetime, indicating that the data item should be deleted when the publisher loses contact with data access point 130, or an indefinite lifetime, indicating that the data item should be maintained after the client's session with data access point 130 is over. Additional details relating to this implementation will now be described.

Figure 14A:
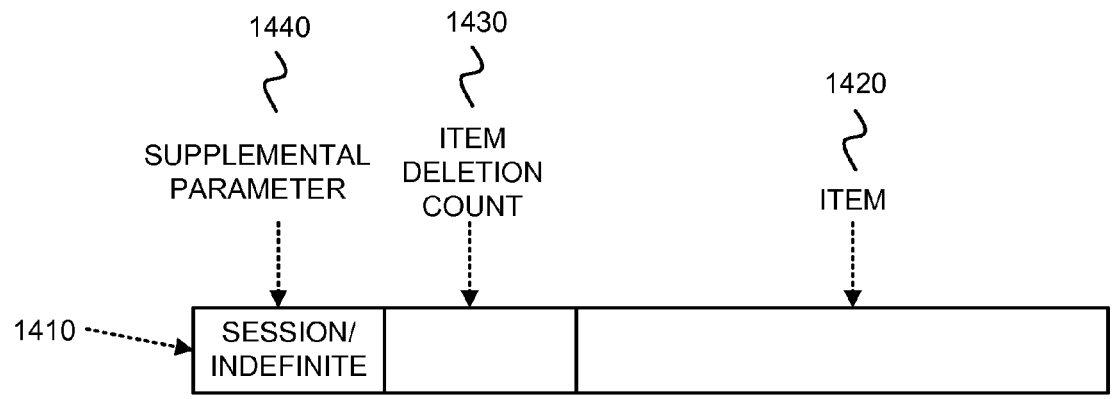
FIG. 14A is a diagram illustrating an entry in a table that includes a session/indefinite supplemental parameter.

FIG. 14A illustrates an entry 1410 in a table, such as table 900, in which entry 1410 includes a session/indefinite supplemental parameter. Data item 1410 may include supplemental parameter field 1440, item deletion count field 1430, and item field 1420, which may each be similar to supplemental parameter field 940, item deletion count field 930, and item field 920, respectively, of entry 1910 (FIG. 9). Supplemental parameter 1410 may be, for example, a one-bit value indicating whether entry 1410 is a session lifetime data item or an indefinite lifetime data item.

Figure 14B:
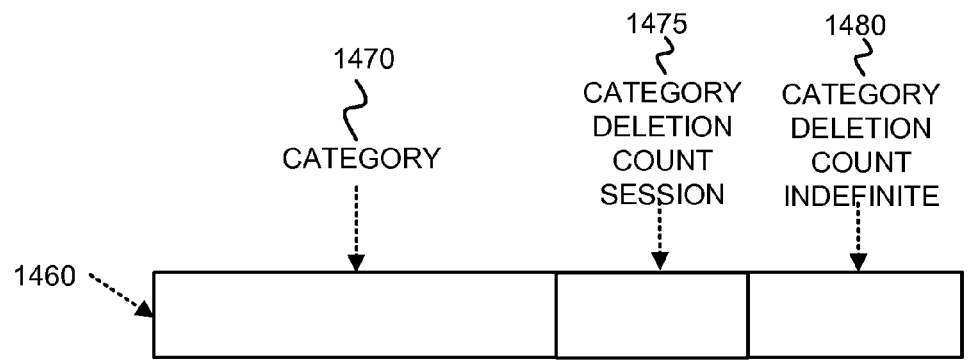
FIG. 14B is a diagram illustrating an entry in a category table.

FIG. 14B illustrates an entry 1460 in a category table, such as category table 1000. Entry 1410 may include category field 1470, category deletion count session field 1475, and category deletion count indefinite field 1480. Category field 1470 may store an identifier that identifies a category of data stored by data access point 130. Each category may correspond to a client that has published data items to database 140.

Category deletion count session field 1475 may store a value representing the quantity of times a deletion request has been received in which the deletion request is for the category stored in category field 1470 and that is applicable to session lifetime data items. Category deletion count indefinite field 1475 may store a value representing the quantity of times a deletion request has been received in which the deletion request is for the category stored in category field 1470 and that is applicable to indefinite lifetime data items.

When a data item is received by database 140 that includes a session/indefinite supplemental parameter, the data item may be stored in item field 1420, and the session/lifetime state of the data item may be stored in supplemental parameter field 1440. Depending on the session/lifetime state of the data item, item deletion count field 1430 may be set to be equal to the value in category deletion count session field 1475 or category deletion count indefinite field 1480.

Figure 15:
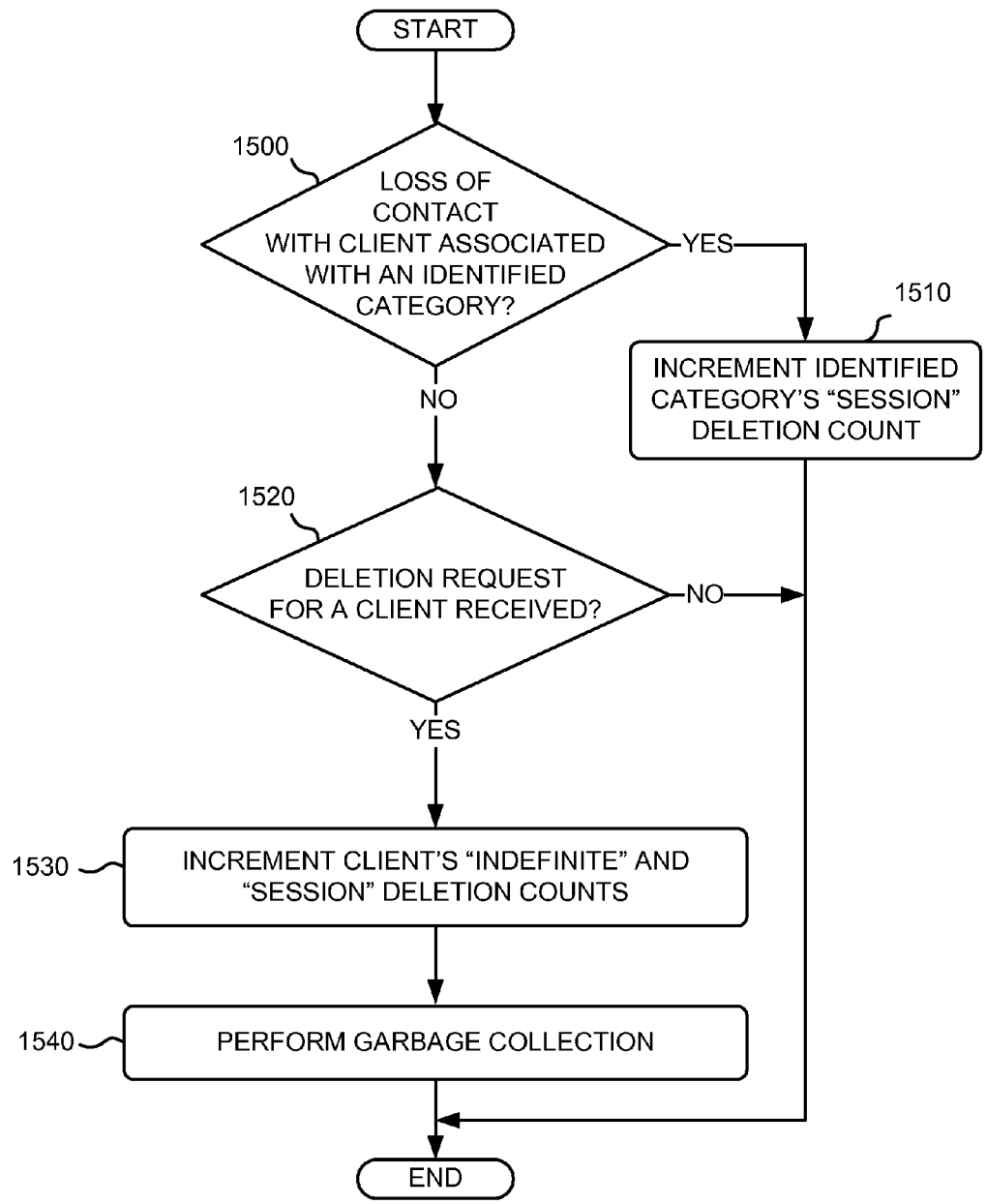
FIG. 15 is a flow chart of an example process for handling category deletion for session/indefinite lifetime data.

FIG. 15 is a flow chart of an example process for handling category deletion for session/indefinite lifetime data. The exemplary process of FIG. 15 may be implemented by data access point 130. In other embodiments, some or all of the blocks described below may be performed by another device or a combination of devices, including or excluding data access point 130.

The exemplary process may include determining if a "loss of contact" has occurred with a client associated with an identified category in table 1000 (block 1500). Data access point 130 may determine if a loss of contact has occurred with any of clients 110 that are associated with any category stored in a category field 1460 in table 1000. Loss of contact may be determined by, for example, a communication session ending or timing-out with a client 110. If a loss of contact has occurred, the identified category's "session" deletion count (category deletion count session field 1475) may be incremented (block 1510). For example, if a loss of contact has occurred with a client 110 associated with a particular first category 1020 in table 1000, category deletion count session field 1475 of the corresponding entry of table 1000 may be incremented (block 1510).

It may be determined if a deletion request for an identified category has been received (block 1520). A client 110 may send a deletion request to data access point 130 via network 120. In one embodiment, the deletion request may identify the client 110 that published the data items.

The client's "indefinite" and "session" deletion counts may be incremented (block 1530). Table 1000 may be searched to identify an entry 1410 that corresponds to the client. The corresponding category deletion count fields 1475 and 1480 for the entry may be retrieved, incremented, and then re-stored in the respective fields 1475 and 1480.

Garbage collection may be performed (block 1540). Garbage collection may be performed in response incrementing the client's indefinite and session deletion counts (block 1530) or in response to incrementing an identified category's session deletion count (block 1510). Alternatively, garbage collection may be performed based on some other event, such as a period timer. The garbage collection process may traverse through stored data items in table 900 to compare each data item's item deletion count with the count value stored in the identified category's "session" or "indefinite" deletion count fields 1475 and 1480. If the comparison indicates that the count value stored in the identified category's deletion count fields 1475 and 1480 is greater than the data item's count value stored in item deletion count field 1430, then the data item may be deleted from table 900 during the garbage collection process, such as that described previously with respect to FIG. 13.

CONCLUSION

As described herein, categories of data may be deleted in an atomic fashion from a database. The atomic category deletion process, as described herein, uses a counter value, which represents a number of times that a given category has been deleted, when deciding whether to delete items of data that are associated with a category that is being processed for deletion. The exemplary embodiments described herein may be applied, for example, to purgePublisher requests in the IF-MAP protocol, where the categories of data that are deleted correspond to sets of data items that are labeled with a same publisher identifier.

In a second example embodiment, multiple counters may be implemented for a category. The choice of which of the multiple counters to use for a particular data item may be based, for example, on the data item and also based on other supplemental information associated with the data item. The atomic category deletion process may determine whether to delete items of data for a category based on both the category and the supplemental information. In one particular implementation, a category may correspond to a particular client and the supplemental information may correspond to whether a data item published by the client has an indefinite lifetime or a session lifetime.

The foregoing description of embodiments described herein provides illustration and description, but is not intended to be exhaustive or to limit the embodiments described herein to the precise form disclosed. Modifications and variations are possible in light of the above teachings or may be acquired from practice of the invention. For example, certain portions have been described as executed as instructions by one or more processing units. However, implementations, other than software implementations, may be used, including, for example, hardware implementations, such as application specific integrated circuits, field programmable gate arrays, or combinations of hardware and software.

While series of blocks have been described in FIGS. 5-8 and 11-15 the order of the blocks may vary in other implementations. Also, non-dependent blocks may be performed in parallel. Even though particular combinations of features are recited in the claims and/or disclosed in the specification, these combinations are not intended to limit the invention. In fact, many of these features may be combined in ways not specifically recited in the claims and/or disclosed in the specification. For example, the isolation rule (i.e., rule that other operations cannot access the data in an intermediate state during a transaction) may be implemented in some embodiments. To achieve isolation, every transaction may begin by taking a "point-in-time" snapshot of the item deletion counts (i.e., from item deletion count field 340), and when a data item is queried from database 140, the snapshot of the item deletion counts may be used rather than the most current item deletion counts. In this way, a category deletion that happens after the "point-in-time" snapshot, but before the transaction finishes, will not affect the transaction. The transaction may include, for example, an update/publish or a query.

Exemplary embodiments have been described herein with respect to storing a single category and a single item deletion count in association with each data item in table 300 of database 140. However, in other embodiments, each item can belong to n categories, where the n categories form a hierarchy. In such embodiments, when storing a data item in table 300, the category is stored in association with the data item that is the farthest from the root of the hierarchy. Then, to delete a category, the category's category deletion count is incremented, and the category deletion counts of all the category's descendants in the hierarchy are also incremented.

Exemplary embodiments have further been described herein as using deletion counts (e.g., item deletion count 340, category deletion count 430) for performing garbage collection. In other embodiments, other "monotonic" values (i.e., values that are always increasing) may be used. For example, in one embodiment, monotonic time stamps could be used instead of the deletion counts. In such an embodiment, an item could be garbage if its timestamp is greater than the category's timestamp.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed:

1. A computing-device implemented method comprising:
   maintaining, by a data access point, a plurality of data items, each data item of the plurality of data items being associated with a respective category of the data item and supplemental information relating to a lifetime of the data item, the category identifying one or more related data items;
   associating, by the data access point, a counter with at least one of the categories, the counter being one of a plurality of counters;
   associating, by the data access point, a deletion count with each of the plurality of data items;
   receiving, by the data access point, a deletion request corresponding to one of the plurality of categories, the deletion request including the supplemental information;
   identifying, by the data access point and based on the deletion request, that the counter is associated with the category corresponding to the deletion request, the identification being performed based on the supplemental information included with the deletion request;
   incrementing, by the data access point, a value of the identified counter;
   selecting, by the data access point, one or more of the data items, of the plurality of data items, based on the incremented value of the identified counter;
   determining, by the data access point and for each of the plurality of data items and based on the supplemental information for each of the plurality of data items, one of the plurality of counters that corresponds to the selected data item; and
   deleting, by the data access point, the selected data item when the counter that corresponds to the selected data item has a value greater than the deletion count of the selected data item.

2. The method of claim 1, where the deletion count associated with each of the plurality of data items is set to a value equal to a value of a counter that corresponds to the data item when the data item is published or updated by a client device connected to the data access point.

3. The method of claim 1, where determining the one of the plurality of counters that corresponds to the selected data item includes:
   determining the one of the plurality of counters based on a function applied to the data item and the supplemental information.

4. The method of claim 3, where the function applied to the data item and supplemental information includes a predefined function or a custom function uploaded from a client device.

5. The method of claim 1, where the supplemental information defines whether a data item has an indefinite lifetime or a session lifetime.

6. The method of claim 1, further comprising:
   determining the respective category by extracting data from the data item.

7. The method of claim 1, where the deletion request is generated based on a client device losing contact with the data access point.

8. The method of claim 1, where receiving the deletion request includes receiving the deletion request from a client device that publishes information to the data access point.

9. A device, comprising:
a memory to store instructions; and
a processor to execute the instructions to:
connect to a plurality of client devices that publish information to the memory;
store, in the memory, a plurality of data items published by the client devices, each of the data items being associated with supplemental information relating to a lifetime of the data items and a deletion count value;
maintain categories corresponding to the plurality of data items, each of the categories identifying one or more related data items;
maintain a counter corresponding to each of the categories, the counter being one of a plurality of counters;
associate a deletion count with each of the plurality of data items;
receive a deletion request corresponding to a first of the categories, the deletion request including the supplemental information;
identify, for the deletion request for the first category and based on the supplemental information, the counter;
increment the identified counter;
select one or more of the plurality of data items based on a value of the counter;
determine, for a selected one of the plurality of data items and based on the supplemental information for the selected one of the plurality of data items, one of the plurality of counters that corresponds to the selected data item; and
delete the selected data item when the counter that corresponds to the selected data item has a value greater than the deletion count of the selected data item.

10. The device of claim 9, where when determining the one of the plurality of counters that corresponds to the selected data item, the processor is to execute instructions to:
determine the one of the plurality of counters based on a function applied to the data item and the supplemental information.

11. The device of claim 10, where the function applied to the data item and supplemental information includes a predefined function or a custom function uploaded from one of the client devices.

12. The device of claim 9, where the supplemental information defines whether a data item has an indefinite lifetime or a session lifetime.

13. The device of claim 9, where the processor further executes the instructions to:
determine the category of a data item based on information extracted from the data item.

14. The device of claim 9, where, when receiving the deletion request, the processor is to execute instructions to:
generate the deletion request based on one of the client devices losing contact with the device.

15. The device of claim 9, where, when receiving the deletion request, the processor is to execute instructions to receive the deletion request from one of the client devices that publishes information to the device.

16. The device of claim 9, where the device includes an access point for the Interface for Metadata Access Points (IF-MAP) protocol.

17. A non-transitory computer-readable medium storing instructions, the instructions comprising:
one or more instructions which, when executed by a device, cause the device to maintain a plurality of data items, each data item of the plurality of data items being associated with a respective category of the data item and supplemental information relating to a lifetime of the data item, the category identifying one or more related data items;
one or more instructions which, when executed by the device, cause the device to associate a counter with at least one of the categories, the counter being one of a plurality of counters;
one or more instructions which, when executed by the device, cause the device to associate a deletion count with each of the plurality of data items;
one or more instructions which, when executed by the device, cause the device to receive a deletion request corresponding to one of the plurality of categories, the deletion request including the supplemental information;
one or more instructions which, when executed by the device, cause the device to identify, based on the deletion request, that the counter is associated with the category corresponding to the deletion request, the identification being performed based on the supplemental information included with the deletion request;
one or more instructions which, when executed by the device, cause the device to increment the identified counter;
one or more instructions which, when executed by the device, cause the device to select one or more of the data items, of the plurality of data items, based on a value of the incremented, identified counter;
one or more instructions which, when executed by the device, cause the device to determine, for each of the plurality of data items and based on the supplemental information for each of the data items, one of the plurality of counters that corresponds to the selected data item; and
one or more instructions which, when executed by the device, cause the device to delete the selected data item when the counter that applies to the selected data item has a value greater than the deletion count of the selected data item.

18. The computer-readable medium of claim 17, where the deletion count associated with each of the plurality of data items is set to a value equal to a value of a counter that corresponds to the data item when the data item is published or updated by a client device connected to the data access point.

19. The computer-readable medium of claim 17, where one or more instructions to determine the one of the plurality of counters that corresponds to the selected data item includes:
one or more instructions to determine the one of the plurality of counters based on a function applied to the data item and the supplemental information.

20. The computer-readable medium of claim 17, where the supplemental information defines whether a data item has an indefinite lifetime or a session lifetime.

* * * * *